Patented Apr. 6, 1926.

1,579,766

UNITED STATES PATENT OFFICE.

CHARLES E. HITE, OF PHILADELPHIA, PENNSYLVANIA.

SLAKED LIME AND THE PROCESS OF PRODUCING IT.

No Drawing.  Application filed August 7, 1925. Serial No. 48,785.

*To all whom it may concern:*

Be it known that I, CHARLES E. HITE, a citizen of the United States, residing at Philadelphia, in the county of Philadelphia and State of Pennsylvania, have invented a new and Improved Slaked Lime and the Process of Producing It, of which the following is a specification.

My invention relates to an improved slaked lime and the process of producing it and consists of a product derived from slaking quicklime with a lime sulphur solution. Any of the well known methods and mechanical devices employed in the art of slaking limes may be used in connection with the production of my improved slaked lime product.

This application is a continuance in part of my co-pending application bearing Serial Number 667,754, filed October 10, 1925, for a "Composition of matter."

My improved slaked lime product, when properly tempered with water, may be used as a fluid-non-abrasive white wash, as a plastic wall-surface finishing coat, as plastic wall-plasters, building mortars and the like when in combination with any of the well known aggregates employed for such purposes. It may, also, be used by itself or as an aggregate in the production of building units, decorative castings, wall blocks, and for other purposes where slaked lime is employed.

The process consists of adding a sufficient quantity of lime sulphur solution to quicklime in order to slake the latter.

The primary object of my invention is the production of an improved slaked lime having potential chemical qualities within the product itself, produced therein during the act of slaking the lime, by virtue of which the use of slaked limes may be extended beyond the range of their present scope and, also, which will increase the functional values of the properties common to all classes of slaked limes.

A specific object of my invention is the production of an improved slaked lime that, when gaged with water to the proper degree of consistency, can be used by itself as a finishing plaster on wall surfaces and which will in time, and with the proper drying, become resisting to abrasion and will be free from surface cracks.

Other specific objects of my invention are:

A—To increase the plasticity of slaked limes.

B—To prevent the "popping" of slaked limes during the course of drying out, when they have been used as plastic finishing wall-plasters and as building-mortars.

C—To increase the binding strength of slaked lime when they are used in a plastic state and in combination with commonly known aggregates for the production of plastic building-mortars, wall-plasters and the like, and when such compositions have become thoroughly dry and sufficiently aged.

D—To produce a slaked lime that will have less shrinkage in drying out from the plastic state than the slaked limes of commerce.

E—To produce a slaked lime that will, in time, become from the plastic state uniformly dense and hard throughout the entire mass if used either by itself or in combination with commonly known aggregates for the production of plastic building-mortars, wall plasters and the like.

F—To produce a slaked lime that will, when dried from the plastic state, increase the tensile strength of building-mortars, wall-plasters and the like when used in combination with the well known aggregates employed for such purposes.

G—To produce an improved slaked lime that can be made in the mechanical hydrater now in common use at the lime plants.

H—To produce an improved slaked lime that may be marketed in bags as a dry powdered product and which will not deteriorate while standing unused in the bags.

I—To produce an improved slaked lime of uniform character at a moderate cost in excess of the present cost of production.

Slaked lime is now extensively produced at the lime plants as a dry powdered product, and is marketed in bags under various trade-names, such as, "New Process Lime", "Hydrated Lime", "Limoid", etc.

The ordinary slaked lime, or the "hydrated" lime of commerce is never used alone as a finishing wall-coat, except for what is known as "white-wash", which is easily rubbed off, or can be readily washed off the surfaces of walls, and it is next to an impossibility to paper over a wall surface that has been white-washed. All slaked limes shrink greatly in drying out from the plastic state and this shrinkage produces cracks. In practice sand is almost universally added to lime mortars, the proportions being from two to four parts of sand to one part lime-paste or of "hydrated" lime, the mass is then tempered with water to the proper degree of consistency for working.

The hardening of such mortars is merely a drying out of the composition accompanied by a limited surface recarbonation, that has been found to penetrate the mortar only about one-sixteenth of an inch even after years of exposure. In some cases other aggregates are employed, these are well known in the plastering and building arts, and are in common use, they are for example hair, mineral and vegetable fibrous substances, cinders, slag, crushed stone, gravel, Portland cement, hydraulic cement, diatomaceous earths, etc.

The term lime (or "quicklime") is intended to include the products derived from the burning of all classes and kinds of limestone, such as marble, chalk, marl, dolomite, magnesia limestone, high calcium limestone, etc.

The various classes of quicklimes require different quantities of water to slake, either to the consistency of lime-paste, or lime-putty, or to the dry powdered hydrate, and these quantities are definitely known for the different classes or kinds of quicklimes.

There are, also, various methods in vogue for slaking quicklimes including that of the mechanical hydrater, which is supplanting all of the older methods and is in general use at most of the larger lime plants.

In practice I prefer to use a concentrated lime sulphur solution such as is referred to on page 78 of Zoological Bulletin, Pennsylvania Department of Agriculture, vol. 1, No. 2, March 1911, which has the following proportions; quicklime one pound, sulphur two pounds, water eight and one-third pounds (one gallon), all boiled together according to directions for producing lime sulphur concentrates and which solution should have a specific gravity of approximately 1.25 when finished.

This solution may be used either in its concentrated form or it may be diluted with water to any desired specific gravity less than 1.25 and the quicklime slaked with the proper quantity of such solution, by any of the well known methods for slaking and hydrating quicklimes. If a concentrated solution is used to slake the quicklime to a dry powder it will require slightly more of the lime sulphur solution than the proper quantity of water used for the same purpose, and that quantity of water is, of course different for different classes of quicklimes.

It is evident to those skilled in the art that the specific gravity of the lime sulphur solution used to slake the quicklime indicates approximately the quantity of calcium sulphur salts which are retained by the slaked lime, and this quantity of calcium sulphur salts is a percentage by weight of the total quantity of improved slaked lime. The quantity of calcium sulphur salts varies from a fraction of 1% to approximately 5% of the total quantity by weight of the improved slaked lime.

In actual practice I have found that in open air slaking of high calcium quicklimes to a dry powder it take approximately 20% more of the concentrated lime sulphur solution than the proper quantity of water for the same purpose.

If the quicklime is to be slaked to the consistency of lime-paste or lime-putty more of the lime sulphur solution will be required for the purpose. If, on the other hand, the lime sulphur solution is diluted, for example to a specific gravity of 1.03, it will require only about 5% more of the diluted lime sulphur solution than the required quantity of water for the same purpose, and a slight quantity more to slake to the consistency of lime-paste or lime-putty. The improved slaked lime product is but slightly soluble in water when freshly made, even when slaked with a concentrated lime sulphur solution as herein stated, and becomes wholly insoluble in water when dried and aged. My improved slaked lime product has considerably more binding strength, when used in combination with the well known aggregates for the production of wall-plasters, building-mortars and the like, than the ordinary slaked limes or the hydrated limes of commerce. Lime sulphur concentrates can be purchased in the open market or the manufacturers can produce their own concentrates according to any of the formulas published in the agricultural bulletins, Government reports, etc.

I do not limit my invention of an improved slaked lime to any particular use or application, or to any class of aggregates that may be used in combination therewith.

Having thus fully described my invention, what I claim as new and useful is:—

1. An improved slaked lime containing from a fraction of one per cent to five per cent of calcium sulphur salts, as described.

2. An improved slaked lime containing a small amount of calcium sulphur salts, as described.

3. The process which consists in slaking quicklime with a lime sulphur solution.

4. The process which consists in slaking quicklime with a lime sulphur solution of a specific gravity of 1.03 to 1.25.

5. The process of producing a lime product which consists in mixing a sufficient quantity of lime sulphur solution to a given quantity of quicklime to thoroughly slake the same.

In testimony whereof, I have hereunto affixed my signature.

CHARLES E. HITE.